Sept. 1, 1953　　　M. B. DOYLE　　　2,650,987
AUTOMOBILE TIME-CLOCK STARTING MECHANISM
Filed June 21, 1950

Inventor
Mary B. Doyle
A. Hiram Sturges
Attorney

Patented Sept. 1, 1953

2,650,987

UNITED STATES PATENT OFFICE 2,650,987

AUTOMOBILE TIME-CLOCK STARTING MECHANISM

Mary B. Doyle, Omaha, Nebr.

Application June 21, 1950, Serial No. 169,462

3 Claims. (Cl. 290—2)

This invention relates to automobiles and more particularly it is an object of the invention to provide a time-clock actuated mechanism to warm up an automobile interior while empty and parked.

There is probably no frequent experience in car ownership more unpleasant than climbing into a cold car in the wintertime. It is, therefore, an object of this invention to provide means for eliminating this factor.

Another object of the invention is to provide automatic switch mechanisms that will switch off the ignition and stop the engine of the car after an adequate warm-up period or after a preset time period has ended.

A further object of the invention is to provide a switch which will switch off the ignition in the event that the gears of the car are left in any other position except the neutral position.

Another object of the invention is to minimize the wear on the various parts of the motor by idling and warming up the engine prior to putting driving loads upon the engine.

Yet another object of the invention is to provide a device for the purpose described which is sturdy and durable in construction, reliable and efficient in operation, and relatively simple and inexpensive to manufacture, assemble and utilize.

Still another object of the invention is to provide a system as described having an air temperature responsive thermostat disposed in the riding compartment of the automobile and connected to the wiring of the automobile in a manner whereby the automobile will cease operation when the riding compartment air temperature reaches a pre-selected point.

Still a further object is to provide a car starting system as described which is thief-proof because without the use of an ignition key the car will not operate when the gear shift lever is in any position other than neutral.

Other and still further objects and advantages of the invention will become apparent from the following detailed description of a preferred embodiment thereof.

In the drawings:

Figure 1 is a view from the driver's position of an automobile dashboard and adjacent parts. Portions of the dashboard, firewall and floor boards have been broken away to reveal the mechanism and wiring thereof. The ignition circuit and starter button circuit are only partially shown in order to clarify the wiring arrangement of the invention.

Figure 2 is a top plan view of the switch employed for switching off the ignition when the gears are in other than a neutral position. The switch is attached to an upper portion of the steering column of a car. The steering column, shift lever, and steering wheel are shown broken away for convenience of illustration.

Figures 5, 6:
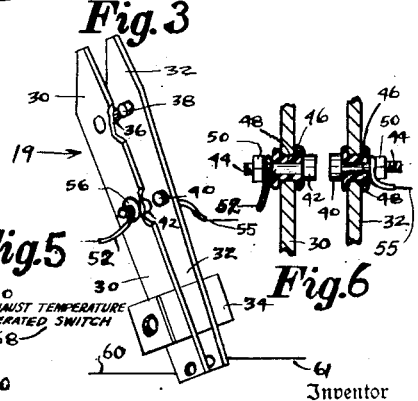

Figure 5 is a perspective view of the switch employed in the clock Patent 2,096,620 granted to J. A. Robertson on October 19, 1937, entitled "Time Switch." The switch has been modified in the invention. The clock parts adjacent the switch are not repeated in this drawing.

Figure 6 is a detail view of the modifications attached to the spring blades of the switch shown in Figure 5. The spring blade ends are broken away and a medial portion of the blades is shown in cross section.

Figure 1:
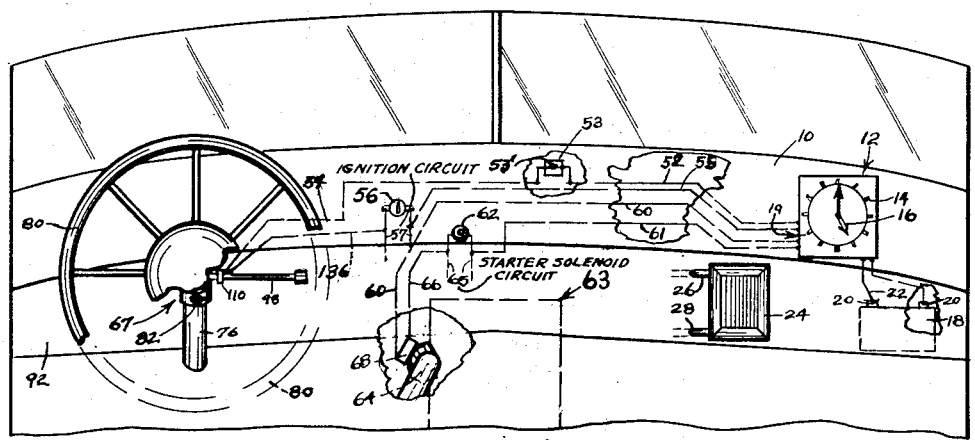

As shown in Figure 1, the right hand side of the dashboard is provided with a time switch clock 12 of the model shown in the Robertson patent, previously mentioned.

The switch clock 12 is provided with forty-eight pull-push pins 14 arranged around the face of the clock 12. These pins are for the purpose of setting the desired program of switch operation. When the pins 14 are pushed into the limit of their travel no switching operation occurs.

If a pin is pulled out, a switch closing operation occurs when the hour hand 16 of the clock reaches the time position of the pulled out pin, and the switch so closed remains in the closed position for fifteen minutes and then opens if the next pin in a clockwise direction is not pulled out.

The foregoing is old and more fully described in the Robertson patent.

As shown in Figure 1, an automobile battery 18 shown partially in dotted lines under the clock 12 is provided with positive and negative poles 20. Two wires 22 extending from the clock 12 are separately connected, both to one of the poles 20, and provide a circuit to operate the electric motor of the clock 12. If a spring driven clock were used in place of the clock 12, the circuit would not be necessary.

A conventional water heater 24 is shown beneath the dashboard 10 provided with a water intake pipe 26 and a water outlet pipe 28 for heating the interior of the car as later described.

Figures 2, 3:
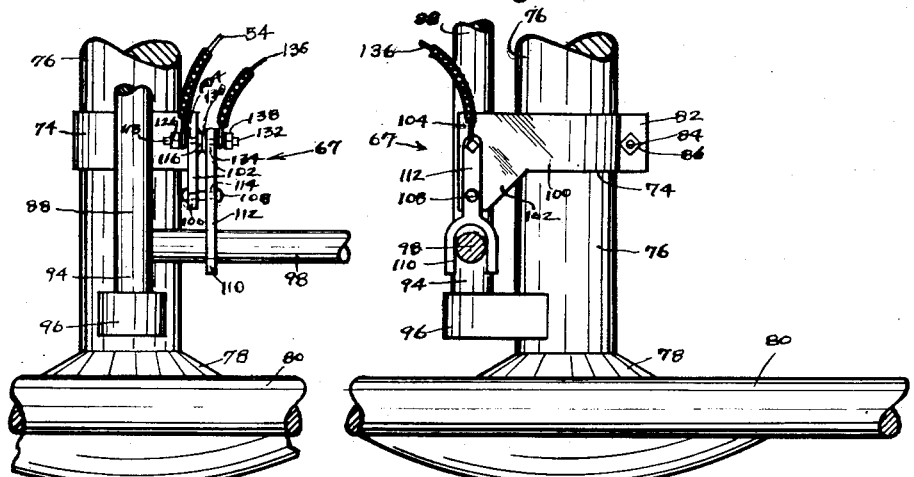
Figure 3 is a side view of the neutral position switch, shift lever, steering column and steering wheel shown in Figure 2.
Figure 4:
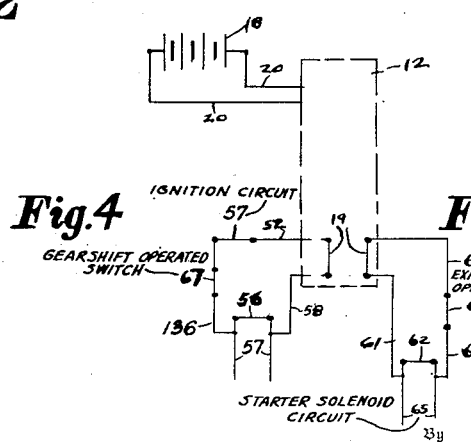
Figure 4 is a layout plan of the electrical circuits employed, wherein the time switch clock employed in the invention is outlined in dotted lines.

As shown in Figure 2 of the patent to J. A. Robertson and as shown modified in Figures 5 and 6 in the present invention, the switch 19 included in the time clock 12 comprises a pair of spaced apart parallel spring blades 30 and 32 mounted at one end in an insulating mounting block 34, which latter is secured to the clock framework by means not shown.

Two upper contact buttons 36 and 38, disposed in a position facing each other, are each secured to one of the spring blades 30 and 32 and are normally spaced apart from each other between the said blades 30 and 32. Two lower contact buttons 40 and 42, also normally spaced apart, are disposed facing each other and secured at a medial position, one to each of the blades 30 and 32.

The lower buttons 40 and 42 are each integrally formed to the threaded rivet pins 44 which latter are disposed through the center of hollow insulating rivets 46. The hollow rivets 46 are composed of rubber or other insulating material, and are disposed, one in each of the spring blades 30 and 32, through an aperture 48, which latter are provided through a medial portion of the blades 30 and 32.

Two nuts 50, one threaded to each of the threaded ends of the rivet pins 44, secure a wire 52 to the pin 44, which is insulated from the blade 30, and secure a further wire 55 to the pin 44 which is insulated from the spring blade 32.

The wire 52 extends across and behind the dashboard 10 and is connected to one element of an air temperature responsive thermostatic switch 53. The air thermostat is that type of switch which may be permanently set to break the circuit when the temperature inside the car reaches the degree of air temperature desired and set by the operator, by moving its lever 53'.

A further wire 54 extends from the other element of the thermostatic switch 52 across and behind the dashboard 10 and is connected to a neutral gear position switch as later described.

The wire 55, from the spring blade 32, extends across and behind the dashboard 10 and is connected into the ignition circuit as later described.

An ignition key switch 56, located at a medial position upon the dashboard 10 is connected into the ignition circuit 57, which latter is indicated by two wires extending downwardly from the key switch 56 and are there broken off for convenience of illustration. The wire 55 is connected to one of the ignition circuit wires 57.

A wire 60 is connected to the lower end of the spring blade 30. A further wire 61 is joined to the lower end of the spring blade 32. A starter push button 62 is shown in the middle of the dashboard 10 and is connected into a starter motor solenoid circuit, as later described.

When the spring blades 30 and 32 are allowed to move towards each other by a mechanism of the clock 12 described in the Robertson patent, the contact buttons 36 and 38 and the contact buttons 40 and 42 meet each other.

Since the contact buttons 40 and 42 are insulated from the spring blades 30 and 32, current will flow between the wires 52 and 55.

The contact buttons 36 and 38 are secured directly to the spring blades 30 and 32, and when in contact, permit current to flow through the blades between the wires 60 and 61 of the starter motor solenoid circuit.

Shown partially in dotted lines in Figure 1, an internal combustion engine 63 and its exhaust manifold 64 are outlined in their conventional positions.

A bimetallic thermally responsive switch 68 is strapped, welded, or otherwise secured flush and in contact with the exhaust manifold 64.

The described wire 60 extends from the spring blades 30 of the time switch 19 to one element of the bimetallic switch 68. The solenoid circuit for the starter motor is only shown at the point where it connects to the starter push button 62. Two wires 65, one from each element of the push button 62, extend downwardly therefrom and are broken off. The two wires 65 indicate the conventional circuit to the solenoid for the starter motor. The solenoid and starter motor are not shown for convenience of illustration.

A wire 66 extends from the other element of the bimetallic switch 68 and connects to one of the wires 65 of the solenoid circuit. The described wire 61 which extends from the time switch 19 connects to the other wire 65 in the solenoid circuit.

In this manner the starter button 62 is by-passed and the time switch 19 accomplishes the function of the starter button 62, as later described.

The ignition circuit is shown in the drawing only at that point where it joins the key switch 56. Two wires 57 of the ignition circuit extend downwardly, one from each element of the key switch 56, and are broken off for convenience of illustration.

The described wire 55 which extends from the time switch 19 connects to one of the ignition circuit wires 57 below the key switch 56. The described wire 52 which extends from the time switch 19 further extends through wire 54 to a neutral gear position switch shown in general by the numeral 67.

A wire 136 connects to the other wire 57 of the ignition circuit below the key switch 56 and also extends to the neutral gear switch 67. In this manner, the key switch 56 is by-passed and its function is accomplished by the time switch 19.

The neutral gear position switch 67, partially shown in Figure 1 and best shown in Figures 2 and 3, will now be described.

As shown in Figures 2 and 3, a circular band 74 extends around the steering column 76 of the automobile. The circular band 74 is spaced away from the hub 78 of the steering wheel 80.

The band 74 is provided with two spaced apart, downwardly extending, parallel tangs 82. Two axially aligned apertures are provided through the tangs 82, through which is disposed a threaded bolt 84. A nut 86 is disposed around the threaded end of the bolt 84 and bears against the tang 82, whereby the band 74 is tightly secured to the steering column 76.

As is conventional with many modern automobiles, a shift rod 88 aligned with and spaced above the steering column 76 extends downwardly through the firewall 92 of the automobile.

The upper end 94 of the shift rod is rotatably journaled into an upstanding bearing block 96, which latter is secured to the upper side of the steering column 76. A shift lever 98 is secured to and normally extends outwardly at right angles from the upper end 94 of the shift rod 88. An upstanding plate 100 is welded or otherwise secured at a tangent from the circular band 74 and on that side of the steering column 76 that the shift lever 98 is normally disposed.

The upstanding plate 100 is provided with an integral arm 102, which latter extends from the upper end 104 of the plate 100 toward the shift lever 98. The outer end of the arm 102 is provided with an aperture 106 through which is disposed an axle pin 108. A yoke 110 disposed about the shift lever 98 is secured to a pivot lever 112. The pivot lever 112 is disposed alongside and parallel with the upper end 104 and arm 102 of the upstanding plate 100. The yoke 110 and pivot lever 112 are integrally formed together of electrical insulating material such as a phenol condensation product.

The pin 108 is disposed through an aperture 114, which latter is disposed through a medial portion of the pivot lever 112. An electrical contact button 116 provided with an integrally formed threaded bolt 118 is disposed upon the upper side surface of the upstanding plate 100. The bolt 118 extends through an aperture provided in the upper end 104 of the plate 100.

A terminal end of the described wire 54 from one element of the thermostat 53 is secured around the bolt 118. A nut 126 threadedly disposed around the bolt 118 secures the wire 54 to the bolt 118 and flush against the upstanding plate 100.

A further contact button 130 disposed in contact with the button 116 at times when the gears of the car are in neutral, is also integrally provided with a threaded bolt 132. The threaded bolt 132 extends through an aperture 134, which latter is disposed through that end of the pivot lever 112 which is opposite the yoke 110. One end of a wire 136 is wound about the bolt 132. A nut 138 threaded upon the bolt 132 secures one end of the wire 136 to the bolt 132 and flush against the side of the pivot lever 112. The wire 136 extends from the bolt 132 and is connected to the other wire 57 of the ignition circuit beneath the key switch 56.

As shown in the patent granted to Robertson, the clock 12 is designed with the pull pins 14 designated at fifteen-minute intervals in each of the twelve hours, whereby in the event that the operator desires to have the car started at five o'clock, he pulls the five o'clock tab on the face of the clock 12 and also the tab designating five-fifteen o'clock. Since the time-switch 19 completes the ignition circuit 57 and completes the solenoid circuit 65, which latter allows current to flow from the battery to the starting motor, the car engine 63 will turn over until such time as combustion occurs in the cylinders of the engine.

After the engine 63 starts, hot exhaust gases flow through the exhaust manifold 64 and heat the elements of the bimetallic switch 68, whereby they come out of contact with each other and whereby they interrupt the solenoid circuit 65.

In this manner, the bimetallic switch 68 prohibits the starting motor from turning over after the engine 63 has started.

As shown in Figures 2 and 3, the shift lever 98 is in a neutral position and the contact buttons 116 and 130 do not interrupt the ignition circuit 57.

If the shift lever 98 is left in any other position than the neutral position, the pivot lever 112 will turn under pressure the shift lever 98 acting through the yoke 110 and disengage the contact buttons 116 and 130, thereby interrupting the ignition circuit 57 and prohibiting the motor 62 from causing the car to start without an operator.

During the fifteen-minute period when the engine is running, warm water from the engine 63 will flow through the water heater 24 and warm the interior of the car.

At the end of the fifteen-minute period set by the operator wherein the given instance is five-fifteen o'clock, the time switch 19 interrupts the ignition circuit 57 and stops the engine 63 after the warm-up period is over.

If the temperature of the air inside the car reaches the desired temperature which the operator sets by the thermostat 53, the switch of the thermostat 53 interrupts the ignition circuit 57 and stops the engine 63 before the time limit set by the clock is up.

This invention has provided an automobile pre-heater that will allow the engine to turn over for a given period before the motorist wishes to use his car. This in turn allows the immediate use of the automobile when the engine is warm and therefore minimizes wear of the engine parts.

This invention has provided a car pre-heater that will allow an operator to immediately have warm air from his conventional water heater the moment he steps into his car.

This invention has also provided a safety feature for an automatically startable engine that will not operate in the event that the automobile's gears are left in other than neutral position.

From the foregoing description, it is thought to be obvious that an automobile time-clock starting mechanism constructed in accordance with my invention is particularly well adapted for use, by reason of the convenience and facility with which it may be assembled and operated, and it will also be obvious that my invention is susceptible of some change and modification without departing from the principles and spirit thereof, and for this reason I do not wish to be understood as limiting myself to the precise arrangement and formation of the several parts herein shown in carrying out my invention in practice, except as claimed.

It will be understood that the clock of the Robertson patent can cause the engine to turn off as well as on and the purpose of the thermostatic switch 53 is to cause the engine to turn off when the air temperature has reached the desired degree and before the termination of the fifteen-minute period. With a thermostatic switch, a simpler clock mechanism than that shown in the Robertson patent is sufficient.

The switch 53 is preferably of any well known type having a lever 53', the position of which determines the desired temperature of the interior of the automobile.

I claim:

1. In an automobile having an internal combustion engine, a hot water heater in communication with said engine, an ignition switch, a starter switch, a gear shift lever, and an exhaust manifold: two time-clock switches; a time-clock operably attached to said switches, said time-clock being adjustable for closing said switches at any one of a plurality of preselected times; a lever switch operatable by said lever for closing said lever switch only at times when said lever is in a neutral position; a thermostatic switch disposed adjacent the exhaust manifold, said thermostatic switch being closed except at times when said manifold reaches a predetermined temperature; an air temperature responsive thermostatic switch disposed in the riding compartment of said automobile; a wire connecting a terminal of one of said clock switches to a terminal of said ignition switch; a second wire connecting the other terminal of said clock switch to a terminal of said thermostat; a wire connecting the other terminal of said ignition switch to the other terminal of said lever switch; a wire interconnecting the other terminal of said thermostat and the other terminal of said lever switch; a wire connecting one terminal of the other clock switch to one terminal of said starter switch; a wire connecting the other terminal of said other clock switch to a terminal of said thermostatic switch; and a wire connecting the other terminal of said starter switch to the other terminal of said thermostatic switch.

2. In an automobile having an internal combustion engine, a hot water heater in communication with said engine, an ignition switch, a starter switch, a gear shift lever, and an exhaust manifold: two time-clock switches; a time-clock operably attached to said switches, said time-clock being adjustable for closing said switches at any one of a plurality of preselected times; a lever switch operatable by said lever for closing said lever switch only at times when said lever is in a neutral position; a thermostatic switch disposed adjacent the exhaust manifold, said thermostatic switch being closed except at times when said manifold reaches a predetermined temperature; a wire connecting a terminal of one of said clock switches to a terminal of said ignition switch; a second wire connecting the other terminal of said one clock switch to a terminal of said lever switch; a wire connecting the other terminal of said ignition switch to the other terminal of said lever switch; a wire connecting one terminal of the other clock switch to one terminal of said starter switch; a wire connecting the other terminal of said other clock switch to a terminal of said thermostatic switch; and a wire connecting the other terminal of said starter switch to the other terminal of said thermostatic switch.

3. In an automobile having an internal combustion engine, a hot water heater in communication with said engine, an ignition switch, a starter switch, and a gear shift lever: two time-clock switches; a time-clock operably attached to said switches, said clock being adjustable for maintaining said switches open except for a preselected period beginning at a pre-selected time; a lever switch operatable by said lever for closing said lever switch only at times when said lever is in a neutral position; a wire connecting a terminal of one of said clock switches to a terminal of said ignition switch; a second wire connecting the other terminal of said one clock switch to a terminal of said lever switch; a wire connecting the other terminal of said ignition switch to the other terminal of said lever switch; a wire connecting one terminal of the other clock switch to one terminal of said starter switch; and a wire connecting the other terminal of said starter switch to the other terminal of said other clock switch.

MARY B. DOYLE.

References Cited in the file of this patent

UNITED STATES PATENTS

| Number | Name | Date |
|---|---|---|
| 1,269,637 | Olmsted | June 18, 1918 |
| 1,287,266 | Eberly | Dec. 10, 1918 |
| 1,386,844 | Cowen | Aug. 9, 1921 |
| 1,771,866 | Stevenson et al. | July 29, 1930 |
| 1,992,568 | Connor | Feb. 26, 1935 |
| 2,051,240 | Berryman | Aug. 18, 1936 |
| 2,096,620 | Robertson | Oct. 19, 1937 |

FOREIGN PATENTS

| Number | Country | Date |
|---|---|---|
| 751,276 | France | June 19, 1933 |